(12) United States Patent
Prisse et al.

(10) Patent No.: US 9,006,923 B2
(45) Date of Patent: Apr. 14, 2015

(54) ELECTRICAL POWER SUPPLY SYSTEM AND METHOD FOR AN AIRCRAFT

(75) Inventors: Lucien Prisse, Toulouse (FR); Brice Aubert, Toulouse (FR); Vincent Pauvert, Nailloux (FR); Dominique Alejo, Saint-Gauzens (FR)

(73) Assignee: Airbus Operations S.A.S., Toulouse (FR)

( * ) Notice: Subject to any disclaimer, the term of this patent is extended or adjusted under 35 U.S.C. 154(b) by 624 days.

(21) Appl. No.: 13/379,821

(22) PCT Filed: Jun. 25, 2010

(86) PCT No.: PCT/FR2010/051313
§ 371 (c)(1),
(2), (4) Date: Jun. 5, 2012

(87) PCT Pub. No.: WO2011/001079
PCT Pub. Date: Jan. 6, 2011

(65) Prior Publication Data
US 2012/0235470 A1 Sep. 20, 2012

(30) Foreign Application Priority Data
Jun. 29, 2009 (FR) ...................................... 09 54425

(51) Int. Cl.
*H02G 3/00* (2006.01)
*H02J 3/26* (2006.01)

(52) U.S. Cl.
CPC .............. *H02J 3/26* (2013.01); *B64D 2221/00* (2013.01); *Y02E 40/50* (2013.01)

(58) Field of Classification Search
CPC ........................................................ B60L 1/00

USPC ................................................... 307/9.1, 10.1
See application file for complete search history.

(56) References Cited

U.S. PATENT DOCUMENTS

| | | | |
|---|---|---|---|
| 2,753,476 A * | 7/1956 | Watt | ............................... 310/178 |
| 3,684,956 A | 8/1972 | Barbacsy et al. | |
| 3,705,775 A | 12/1972 | Rioux | |
| 6,124,646 A | 9/2000 | Artinian et al. | |
| 7,638,890 B2 * | 12/2009 | Lando et al. | ................. 290/36 R |

(Continued)

FOREIGN PATENT DOCUMENTS

| FR | 2 907 760 | 5/2008 |
|---|---|---|
| FR | 2 907 761 | 5/2008 |

(Continued)

OTHER PUBLICATIONS

Shen. M. et al., "Grounding Transformer Application, Modeling, and Simulation", Power and Energy Society General Meeting—Conversion and Delivery of Electrical Energy in the 21$^{st}$ Century, IEEE, pp. 1-8, XP031303783. (2008).
International Search Report issued on Sep. 27, 2010 in PCT/FR10/051313 filed on Jun. 25, 2010.

*Primary Examiner* — Rexford Barnie
*Assistant Examiner* — Toan Vu
(74) *Attorney, Agent, or Firm* — Oblon, McClelland, Maier & Neustadt, L.L.P.

(57) ABSTRACT

An electrical power supply system and method for an aircraft. The system includes an electrical network including primary generators powering the electrical distribution channels, and an homopolar generator making it possible to create an artificial neutral.

9 Claims, 3 Drawing Sheets

(56) References Cited

U.S. PATENT DOCUMENTS

| | | |
|---|---|---|
| 7,923,857 B2 | 4/2011 | Langlois et al. |
| 2002/0190697 A1 | 12/2002 | Ferens et al. |
| 2008/0100136 A1 | 5/2008 | Langlois et al. |
| 2008/0252267 A1 | 10/2008 | Lando et al. |
| 2011/0175441 A1 | 7/2011 | Langlois et al. |
| 2012/0025604 A1 | 2/2012 | Baumann et al. |

FOREIGN PATENT DOCUMENTS

| | | |
|---|---|---|
| GB | 1 322 040 | 7/1973 |
| WO | 99 41145 | 8/1999 |
| WO | 02 089285 | 11/2002 |

* cited by examiner

ELECTRICAL POWER SUPPLY SYSTEM AND METHOD FOR AN AIRCRAFT

TECHNICAL FIELD

The invention relates to an electrical power supply system and method for an aircraft, for example an airplane.

Hereafter, for simplification reasons, an aircraft of the airplane type will be considered.

BACKGROUND OF THE INVENTION

In aeronautics, the neutral state commonly used is the TN-C state, which means:
- T: neutral of the installation connected directly to the ground,
- N: masses of the installation connected to the neutral conductor,
- C: protective conductor for the masses of the installation and neutral conductor combined.

In an electrical power supply system onboard an airplane, the neutral of each primary generator G is connected to the fuselage 10' of the airplane, at the engine pylons (1 meter of cable) in order to ensure the return of the unbalance current and faults. Furthermore, all of the masses of the equipment are connected to said fuselage. The fuselage therefore plays the role both of neutral and ground conductor. FIG. 1 thus shows a three-phase generator G, the neutral N of which is connected to the fuselage 10', connected to an electric core 11' by its phases ph1, ph2 and ph3, a phase-to-ground fault charge 12' whereof the mass is connected to the fuselage 10'. A fault current id 13' relative to this fault charge 12', which passes toward the fuselage 10', is also illustrated.

In such a configuration, the primary generators G perform the functions of the direct, reverse, and homopolar current component generators for example described in the document referenced [1] at the end of the description.

The neutral state as defined above makes it possible to achieve a significant mass gain while avoiding the addition of extra cables. However, the distribution of the neutral of the primary generators G causes an excess weight for two reasons:

The connection of the neutral of each generator G to the fuselage allows the circulation of the harmonic 3 currents, i.e. the circulation of homopolar currents, which causes additional losses. To greatly reduce the value of these harmonic 3 currents, it is possible to use generators designed with a ⅔ pitch winding structure, which involves a slight attenuation of the fundamental. Consequently, the power-weight ratio of the generator decreases.

In the case of an airplane whereof the fuselage is made from carbon, the neutral of each generator G cannot be connected to the engine pylon. It is connected to the PVR ("Point Voltage Reference") of the ESN ("Electrical Structural Network") 10, as illustrated in FIG. 2. The neutral and the mass of the charges are connected to the ESN.

The location of the primary generators G in the wings of an airplane 20 near each engine 21 and that of the electric cores 22 at the front of the airplane requires a non-negligible neutral cable length 23, as illustrated in FIG. 3, such an "electric core" being a source—charge interconnect node including protective and contact members, the voltage of which is stabilized by an outside element. This results in a significant power-weight ratio in the case where the airplane 20 has four electric power supply channels, and therefore four neutral cables.

The invention aims to eliminate such neutral cables in order to decrease the volume and mass of the electrical power supply on-board the airplane, the primary generators keeping the role of generators of the direct and reverse components, but the homopolar generator function being performed by a specific piece of equipment.

BRIEF DESCRIPTION OF THE INVENTION

The invention relates to an electrical power supply system of an aircraft including an electrical network comprising primary generators powering electrical distribution channels, electrical cores, and charges, characterized in that it comprises means for placing an artificial neutral at the electric cores including an homopolar generator, which is a piece of equipment of the electrical network.

It can comprise a transformer. This can be a transformer rectifier unit. Such a transformer rectifier unit includes:
- a three-phase transformer with galvanic isolation comprising:
  - a wye-connected primary, the neutral of which is grounded,
  - a delta-connected secondary,
  - a wye-connected secondary,
  - a three-column magnetic structure.
- a twelve-phase rectifier stage to create the direct network.

The invention also relates to an electrical power supply method for an aircraft including an electrical network comprising primary generators powering electrical distribution channels, electrical cores, and charges, in which the direct and reverse components of the current are generated using these generators, characterized in that an artificial neutral is placed at the electrical cores and in that the homopolar component is generated using a specific piece of equipment, which is a piece of equipment of the electrical network. This equipment of the electrical network may comprise a transformer. This can be a transformer rectifier unit.

The invention thus makes it possible to eliminate the distribution of the neutral between the primary generators and the electrical cores using cables, with the placement of an artificial neutral at the electric cores, which makes it possible to save in terms of aircraft mass and sizing of said generators. The creation of an artificial neutral using an homopolar generator makes it possible, in fact, to convey the fault currents distributed over three phases in the form of three homopolar components and no longer only on the short-circuit phase alone.

Using a piece of equipment already existing in the electrical network as homopolar generator makes it possible to save in terms of mass while avoiding adding extra equipment.

Using a transformer rectifier unit TRU as homopolar generator makes it possible to mutualize the homopolar generator function on an existing piece of equipment by connecting the neutral of the primary of the transformer to the PVR of the airplane.

DETAILED DESCRIPTION OF THE INVENTION

Figure 1:
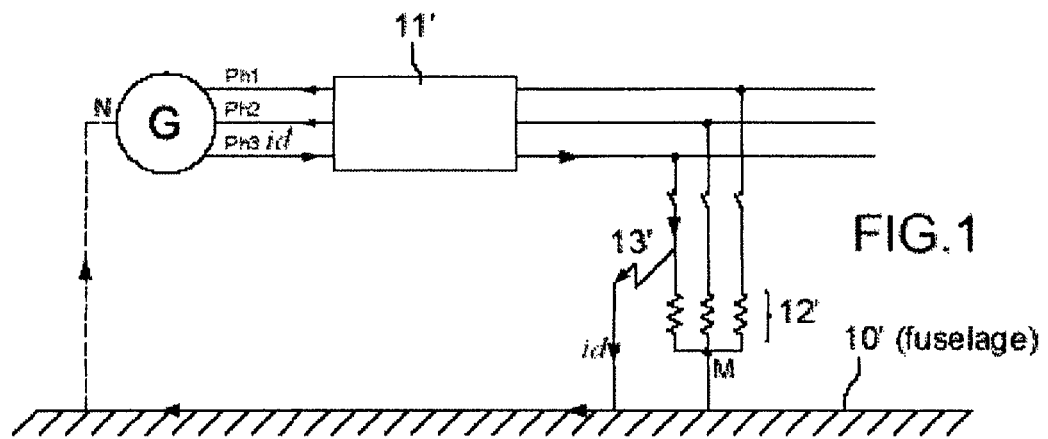
FIGS. 1, 2 and 3 illustrate an electrical power supply system for an airplane according to the prior art.
Figure 2:
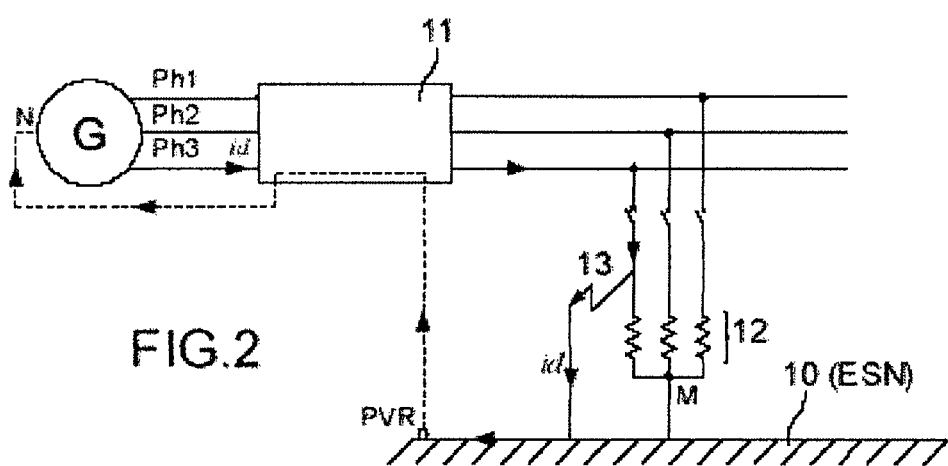
Figure 3:
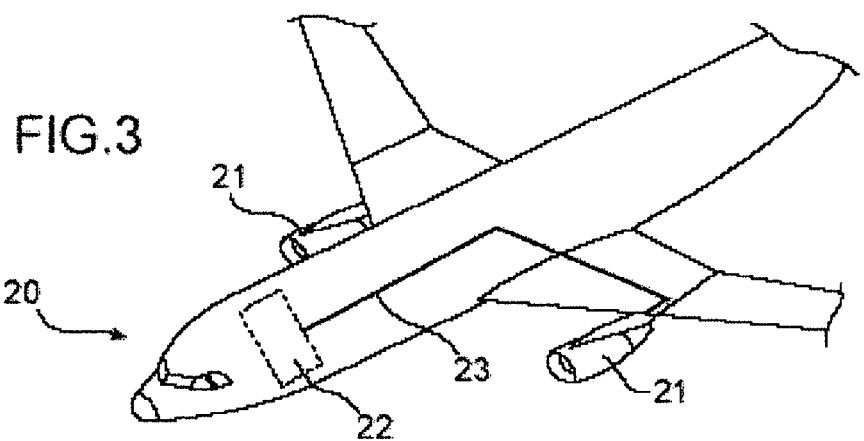
Figure 4:
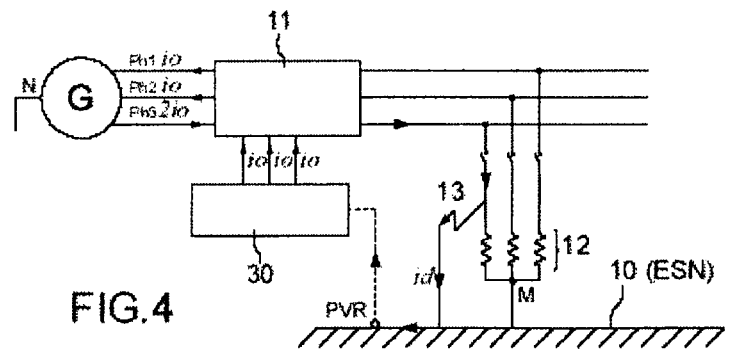
FIG. 4 illustrates the incorporation of a homopolar generator into an electrical network according to the invention.

In the following, the references used for the elements illustrated in FIG. 2 are kept to illustrate similar elements in FIGS. 4, 5 and 6. The electrical power supply system of the invention, as illustrated in FIG. 4, thus comprises an electrical network made up of a primary generator G, an electrical core 11, a fault charge 12, and the ESN of the airplane. It also comprises an homopolar generator 30.

As it is well known by those skilled in the art, an homopolar generator makes it possible to create an impeding neutral on an electrical network not having one, and to ground that network through said impedance. The impedance is calculated so as to limit the fault current to a determined value. The value of the fault current depends on the network one wishes to protect.

Such an homopolar generator 30 is characterized by:
a weak homopolar impedance to facilitate the circulation of the homopolar components,
a strong direct impedance so that the device does not behave as a charge.

In the invention, such an homopolar generator 30 makes it possible to create an artificial neutral that makes it possible to eliminate the neutral cables coming from the primary generators.

Thus, as shown in FIG. 4, in the case of a phase-to-ground fault charge 12, the fault current $i_d$ is conveyed toward the three-phase network via the homopolar generator 30 in the form of three homopolar components $$i_o = \frac{i_d}{3},$$

which are divided over the three phases.

Figure 5:
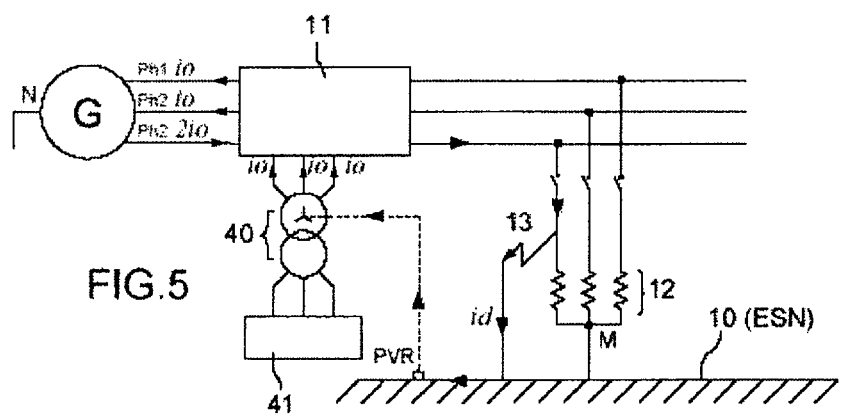
FIG. 5 illustrates the embodiment of the homopolar generator illustrated in FIG. 4 using a transformer whereof the primary is a wye-connected primary.

In one advantageous embodiment of the invention, illustrated in FIG. 5, the homopolar generator function can be performed with a piece of equipment existing in the electrical network of the airplane, which makes it possible to save on mass. However, it is possible to add an additional piece of equipment that makes it possible to create an artificial neutral and to thereby perform the homopolar generator function. This equipment can, for example, be a transformer 40. The secondary of this transformer may or may not be connected to functional loads 41. This transformer 40 must have the following characteristics:
galvanic isolation between primary and secondary, necessary condition for the electrical charges 41 connected to the secondary of the transformer 40 not to be disrupted by the rise of the fault currents,
a wye or zigzag connected primary,
the neutral of the primary grounded,
a three-column magnetic structure in order to minimize the homopolar impedance.

The invention thus makes it possible to reduce the mass of the airplane, due primarily to the elimination of the neutral cable.

The invention also makes it possible to:
increase the power-weight ratio of the generators owing to the increase in the value of the fundamental,
improve the quality of the electrical network by attenuating harmonics 5 and 7 a bit more.

In fact, no longer connecting the neutral of the generators prevents the circulation of the harmonics 3. The ⅔ pitch winding structure, which has the drawback of attenuating the fundamental of the currents, is therefore no longer necessary to eliminate the harmonics 3. It is therefore possible to use another type of winding, for example a ⅚ pitch winding, which makes it possible to minimize harmonics 5 and 7 while obtaining a fundamental value of 10% more relative to a ⅔ pitch winding.

The invention lastly makes it possible to obtain a distribution of the fault currents on three phases in the form of three homopolar components, contrary to the system of the prior art, in which all of the fault currents circulate on the short-circuit phase. Thus, in the invention, at a given fault current, the generator must only provide ⅔ of the fault current on the short-circuit phase instead of its entirety, before the protections are triggered. The sizing of the generators therefore becomes less restrictive relative to the short-circuit currents.

Example of Application

In the example of application, the rise of the fault and unbalance currents is ensured by an artificial neutral done with a transformer rectifier unit TRU operating as an homopolar generator.

Such a transformer rectifier unit TRU 59, used to create a direct network from an alternating three-phase network, is made up of:
a three-phase transformer with galvanic isolation comprising:
a wye-connected primary 60,
a delta-connected secondary 62,
a wye-connected secondary 61,
a three-column magnetic structure 63.
a twelve-phase rectifier stage 64 to create the direct network.

Figure 6:
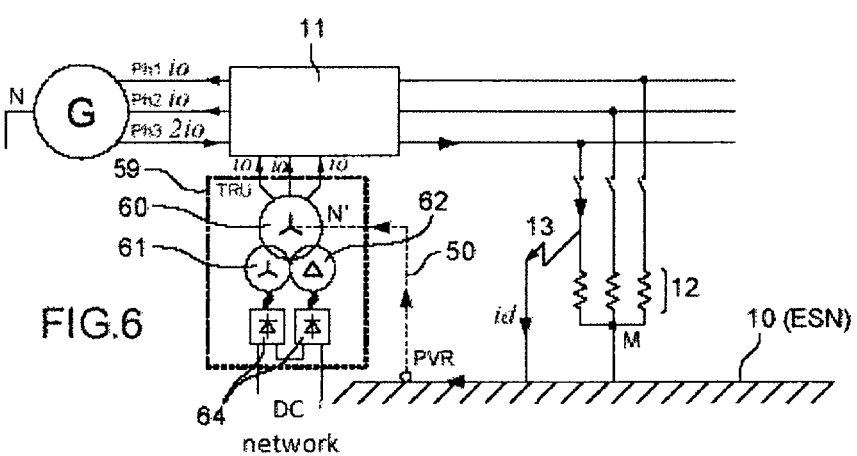
FIG. 6 illustrates an embodiment of the system according to the invention in which a transformer rectifier unit (TRU) is used as homopolar generator.

In this embodiment, the neutral N' of the primary of the transformer 60 is connected by a connector 50 to the ESN 10 of the airplane, as illustrated in FIG. 6. The rise of the homopolar currents to the primary does not disrupt the DC network at the output of the TRU 59. The galvanic isolation between the primary 60 and the two wye-connected and delta-connected secondaries 61 and 62 without a distributed neutral does not allow the circulation of homopolar components.

Figure 7:
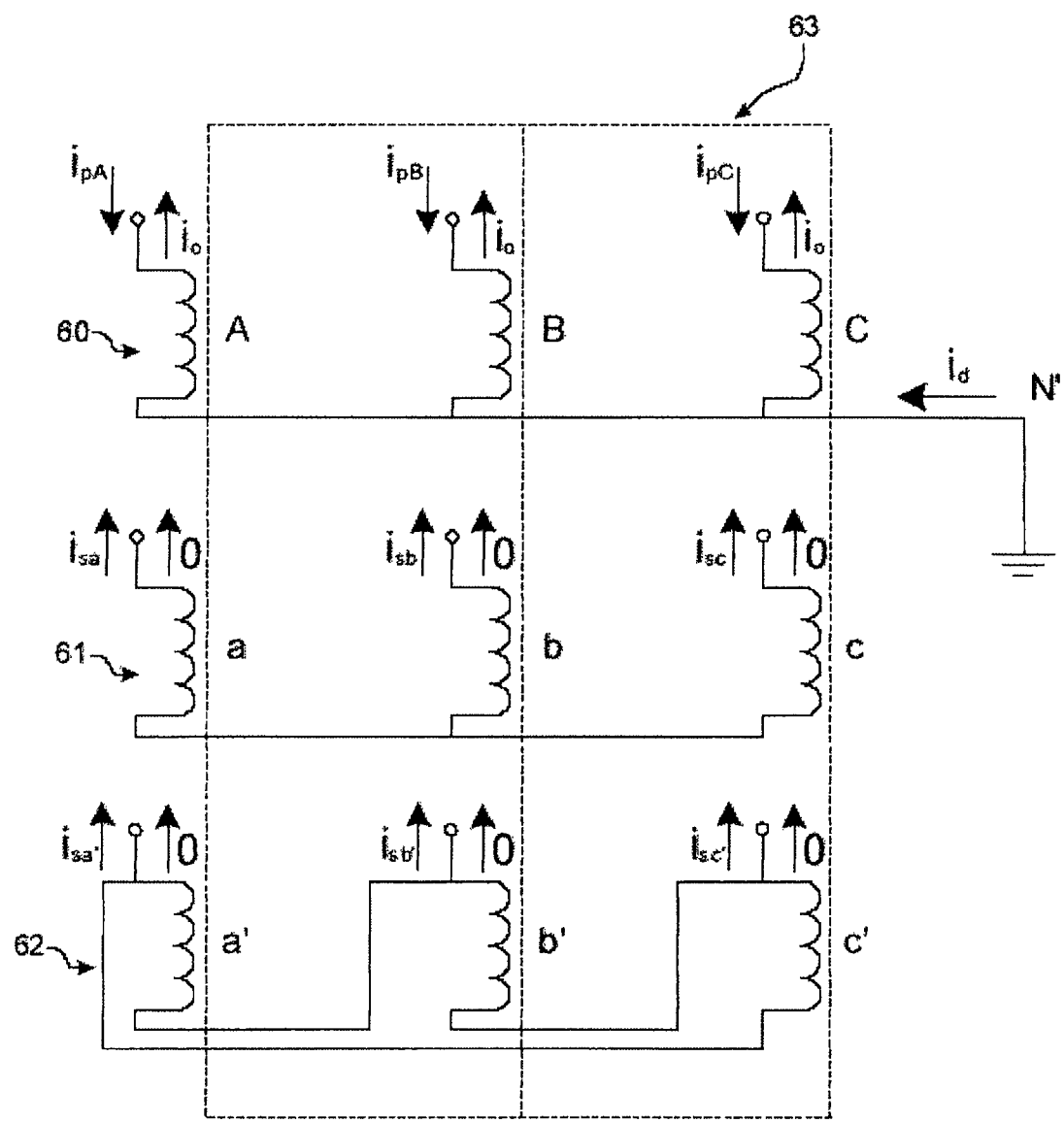
FIG. 7 illustrates the distribution of the currents in a transformer-rectifier as illustrated in FIG. 6 in case of fault.

FIG. 7 illustrates the distribution of the currents in the transformer 59 in case of fault. One thus has:
At the primary 60 of the transformer 59, the direct three-phase currents $i_{pA}$, $i_{pB}$, $i_{pC}$ conveying the power toward the DC network and the homopolar currents $i_o$ coming from the unbalances on the electrical network overlap.
At the secondaries 61 and 62 of the transformer 59, the direct three-phase currents $i_{sa}$, $i_{sb}$, $i_{sc}$, and $i_{sa}'$, $i_{sb}'$, $i_{sc}'$ conveying the power toward the DC network are the only ones to circulate toward the twelve-phase rectifier 64.

REFERENCES

[1] "Protection des réseaux-généralités" by Claude Corroyer (Techniques de l'ingénieur D4800, pp 1-16, 1991).

The invention claimed is:
1. An aircraft comprising:
an electrical power supply system including an electrical network including primary generators powering electrical distribution channels, electrical cores, and charges, wherein the electrical network:
does not include neutral cables connected to the primary generators;

includes a piece of equipment performing an homopolar generator function so as to create an artificial neutral at the electrical cores to eliminate neutral cables connected to the primary generators via a homopolar impedance and a direct impedance, and wherein the homopolar generator is a specific piece of equipment of the electrical network.

2. The system according to claim 1, wherein the homopolar generator includes a transformer.

3. The system according to claim 2, wherein the homopolar generator is a transformer rectifier unit.

4. The system according to claim 3, wherein the transformer rectifier unit includes:
- a three-phase transformer with galvanic isolation including:
  - a wye-connected primary, the neutral of which is grounded,
  - a delta-connected secondary,
  - a wye-connected secondary, and
  - a three-column magnetic structure; and
- a twelve-phase rectifier stage to create the direct network.

5. The aircraft according to claim 1, which is an airplane having a carbon fuselage.

6. An electrical power supply method for an aircraft including an electrical network including primary generators powering electrical distribution channels, electrical cores, and charges, the method comprising:
- generating direct and reverse components of the current using the primary generators,
wherein
- the electrical network does not include neutral cables connected to the primary generators, and
- an homopolar generator function is ensured using a specific piece of equipment of the electrical network so as to create an artificial neutral at the electrical cores to eliminate neutral cables connected to the primary generators via a homopolar impendance and a direct impendance.

7. The method according to claim 6, wherein the piece of equipment includes a transformer.

8. The method according to claim 6, wherein the piece of equipment is a transformer rectifier unit.

9. An aircraft comprising:
- an electrical power supply system including an electrical network including primary generators powering electrical distribution channels, electrical cores, and charges, wherein the electrical network:
  - does not include neutral cables connected to the primary generators;
  - includes a piece of equipment performing an homopolar generator function so as to create an artificial neutral at the electrical cores;
- and wherein the homopolar generator is a transformer rectifier unit, which includes:
  - a three-phase transformer with galvanic isolation including:
    - a wye-connected primary, the neutral of which is grounded,
    - a delta-connected secondary,
    - a wye-connected secondary, and
    - a three-column magnetic structure; and
  - a twelve-phase rectifier stage to create the direct network.

\* \* \* \* \*